United States Patent Office 3,255,069
Patented June 7, 1966

3,255,069
LAMINATED ARTICLE BONDED BY A CURABLE POLYURETHANE ELASTOMER AND AN ORGANIC POLYISOCYANATE AND PROCESS OF MANUFACTURE
Gerald Patrick Crowley and Walter Fairbairn Smith, Manchester, England, assignors to Imperial Chemical Industries Limited, London, England, a corporation of Great Britain
No Drawing. Filed Oct. 25, 1961, Ser. No. 147,480
Claims priority, application Great Britain, Aug. 8, 1961, 28,602/61
2 Claims. (Cl. 161—190)

This invention relates to improvements in or relating to the manufacture of laminated articles.

It has already been proposed in our application No. 147,479 filed Oct. 25, 1961, to manufacture laminated articles by a process in which two or more layers of material, such as natural rubber, latex foam, wood and homogeneous or cellular rigid plastic materials are bonded together using a curable adhesive composition comprising a solution of a polyurethane elastomer and an organic polyisocyanate, characterised in that said polyurethane elastomer is the reaction product of an organic diisocyanate and a crystalline polyesteramide with a melting point not exceeding 50° C., prepared from dicarboxylic acids and glycols, aminoalcohols or diamines in such proportions that from 8 to 64 moles of dicarboxylic acids are used for every mole of primary amino groups, said polyesteramide having an acid value of not more than 5 mg. KOH per g., preferably not more than 3 mg. KOH per g. and a water content of not more than 0.1% by weight, and in that said polyurethane elastomer has a Williams plasticity number of between 100 and 550.

It has also been proposed in our application No. 147,479, filed Oct. 25, 1961, to carry out the process described above using the curable adhesive composition as a pre-formed dry film which is applied to at least one of the surfaces to be bonded.

It has now been found that the processes of the above mentioned application may be advantageously applied to the production of laminated articles in which one of the components of the laminates is a metal. In particular the above processes are particularly useful in the production of laminated articles containing at least one layer of metal and one layer of foamed polyurethane material, such laminated articles being especially useful for thermal insulation.

Thus according to the present invention there is provided a process for the manufacture of laminated articles in which two or more layers of material are bonded together using a curable adhesive composition characterised in that one of the layers is of metal and that the adhesive composition comprises a solution of a polyurethane elastomer and an organic polyisocyanate, characterised in that said polyurethane elastomer is the reaction product of an organic diisocyanate and a crystalline polyesteramide with a melting point not exceeding 50° C., prepared from dicarboxylic acids and glycols, aminoalcohols or diamines in such proportions that from 8 to 64 moles of dicarboxylic acids are used for every mole of primary amino groups, said polyesteramide having an acid value of not more than 5 mg. KOH per g., preferably not more than 3 mg. KOH per g. and a water content of not more than 0.1% by weight, and in that said polyurethane elastomer has a Williams plasticity number of between 100 and 550.

Examples of suitable metals for the production of the laminated materials include steel, tinplate, iron, aluminum, copper, aluminum alloys, brass and the like. Such metals may be in the form of sheets and the like which may conveniently be pretreated by abrading and degreasing.

Examples of suitable foamed polyurethane materials include flexible and rigid foamed polyurethane materilas such as those known from the prior art. For example suitable foamed polyurethane materials may be prepared by the interaction of hydroxyl group-containing materials containing at least two isocyanate reactive groups per molecule such as polyesters, polyethers or polyesteramides with organic polyisocyanates optionally in the presence of catalysts and other additives and of water and/or a low boiling point liquid boiling below 75° C. and inert towards the isocyanate group.

The adhesive compositions may be prepared and applied by the methods described in the previous applications, for example the adhesive composition may be conveniently applied to the metal and/or foam surface by brushing or spraying. The adhesive composition may be applied in one coat or may be applied in a series of thinner coats each coat being allowed to dry for a short time before application of a further coat. The materials used in preparing the adhesive compositions and the curing of the adhesive compositions may be as described in the prior applications.

Laminates prepared by the process of the present invention are particularly useful for heat and sound insulation in metal structures, thus the laminates are useful as head linings in motor cars, for the insulation of caravan bodies, and for sound insulation of engine cowlings such as motor car or aeroplane cowlings.

Head linings for motor cars may be made for example, by laminating a flexible foam to the interior of the motor car roof; before lamination to the roof the foam itself may be laminated on one side to a layer of, for example, a knitted type fabric or may alternatively be surface treated for example by block suedeing.

The invention is illustrated but not limited by the following examples in which all parts and percentages are by weight.

*Example 1*

A solution of 34 parts of a polyesteramide-di-isocyanate reaction product in 66 parts methyl-ethyl ketone and 10 parts ethylene glycol monoethyl etheracetate was mixed with 6.8 parts of an ethyl acetate solution of an isocyanate ended reaction product of glycerol, diethylene glycol and tolylene 2:4-diisocyanate. Two coats of the resulting adhesive solution were applied by brushing onto the surface of a mild steel sheet which had been cleaned by abrading with sandpaper and degreased by wiping with trichloroethylene. An interval of 15 minutes was allowed between application of the first and second coats of the adhesive. The adhesive coating was then allowed to dry for approximately 1 hour and a length of ¼" thick polyester based polyurethane foam was rolled onto the adhesive coated metal surface. A light pressure was then applied by means of a hand roller and the laminate was allowed to cure for 3 days at room temperature. An excellent bond between the polyurethane foam and the mild steel sheet was thus obtained.

The polyesteramide/diisocyanate reaction product used in this example was the reaction product of a 65:35 mixture of tolylene-2:4- and 2:6-diisocyanates with an ethylene glycol/ethanolamine adipate having a melting point of less than 50° C., and acid value of 3.0 mg. KOH per gm. and a water content of less than 0.1%, and containing 16 moles of adipic acid for every mole of primary amino groups. The product had a Williams plasticity number within the range 200–350.

*Example 2*

A solution of 45 parts of a polyesteramide di-isocyanate reaction product (Williams plasticity 160) in a mixture of 55 parts of methyl-ethyl ketone and 10 parts of ethylene glycol monoethylether acetate was mixed with 9 parts of a 50% solution in xylene of a polyisocyanate composition prepared by phosgenating a crude diaminodiphenylmethane, containing approximately 15% of polyamines (mainly triamines), obtained by condensing formaldehyde with aniline in the presence of hydrochloric acid. Two coats of the resulting adhesive solution were applied by brush coating to 18 gauge aluminum sheet which had been roughened by means of emery cloth and degreased by wiping with trichloroethylene. An interval of approximately 15 minutes was allowed between application of the first and second coats of adhesive. The adhesive coated surface was then allowed to dry for approximately 1 hour at room temperature and a length of polyether based polyurethane foam was rolled onto the adhesive treated surface followed by the application of a slight pressure by means of a hand roller. The laminate is sufficiently well bonded to be shaped and cut, e.g., by guillotine shortly after bonding. Full bond strength is obtained after approximately 3 days at room temperature.

The polyesteramide/diisocyanate reaction product used in this example was the same as that used in Example 1 except that it had a Williams plasticity No. of 160.

What we claim is:

1. A process for the manufacture of laminated articles which comprises bonding at least one layer of metal selected from the group consisting of steel, tinplate, iron, aluminum, copper, aluminum alloys and brass to a layer of foamed polyurethane material with a curable adhesive composition comprising a solution of a polyurethane elastomer and an organic polyisocyanate, said polyurethane elastomer being the reaction product of an organic diisocyanate and a crystalline polyesteramide in substantially stoichiometrically equivalent proportions, said polyesteramide having a melting point not exceeding 50° C. and being the reaction product of dicarboxylic acids, glycols and compounds selected from the group consisting of aminoalcohols and diamines in such proportions that from 8 to 64 moles of dicarboxylic acids are used for every mole of primary amino groups, said polyesteramide having an acid value of at most 5 mg. KOH/g. and a water content of at most 0.1% by weight, and said polyurethane elastomer having a Williams plasticity number of between 100 and 550.

2. A laminated article manufactured by the process of claim 1.

References Cited by the Examiner
UNITED STATES PATENTS 2,356,005    8/1944    Roquemore.
2,905,582    9/1959    Coleman et al.
2,992,939    7/1961    Larson.

EARL M. BERGERT, *Primary Examiner.*

E. G. WHITBY, *Assistant Examiner.*